April 8, 1941.  I. A. CHAIKIN  2,237,925
GARMENT BOTTOM TRIMMER
Filed Dec. 7, 1938  3 Sheets-Sheet 1
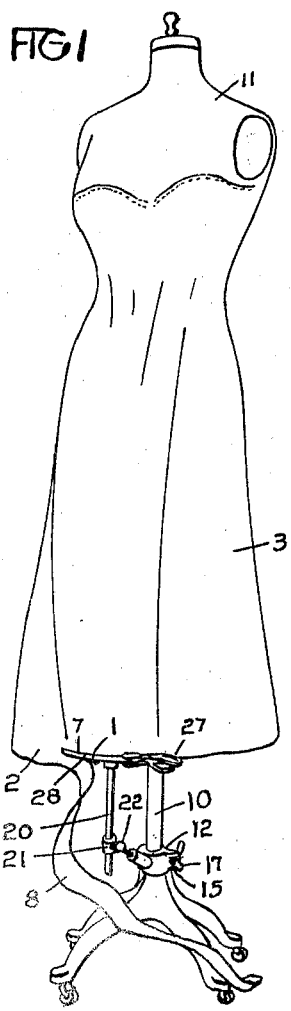
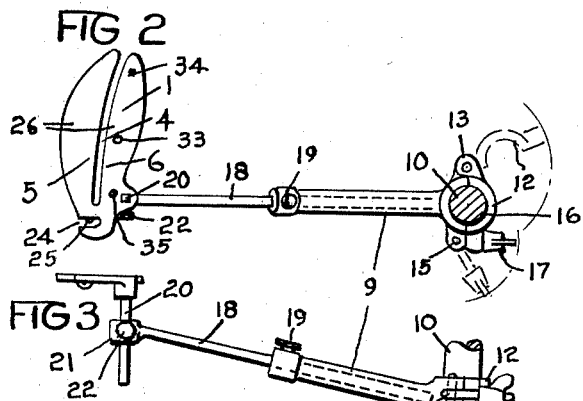
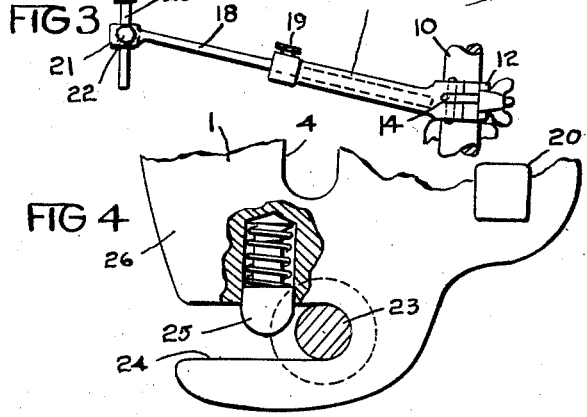
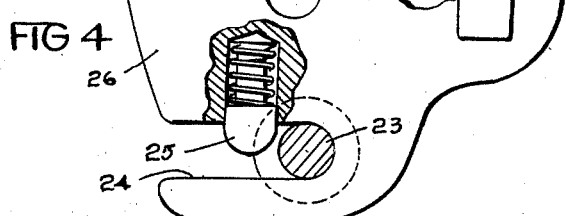
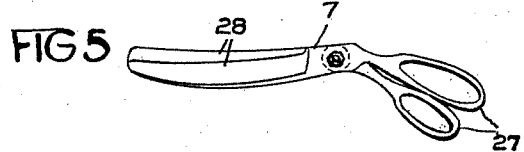
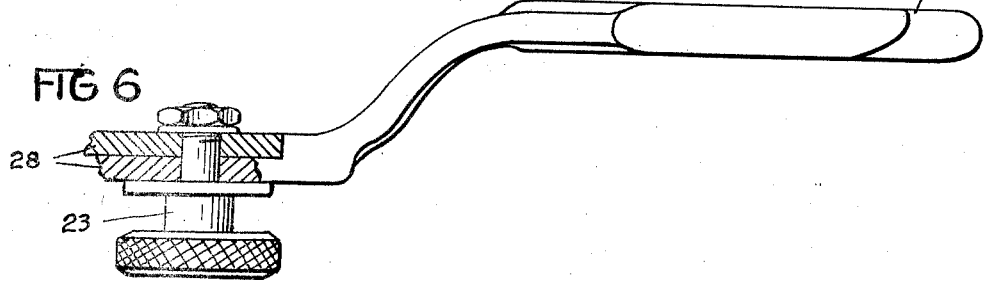
INVENTOR.
ISIDORE A. CHAIKIN.
BY Paul A. Talbot
ATTORNEY.

April 8, 1941.    I. A. CHAIKIN    2,237,925
GARMENT BOTTOM TRIMMER
Filed Dec. 7, 1938    3 Sheets-Sheet 2
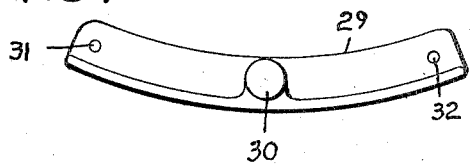
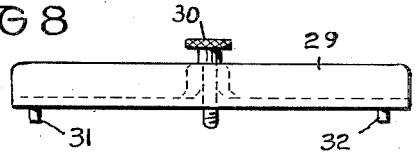
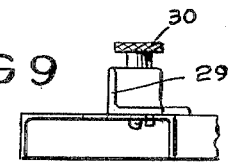
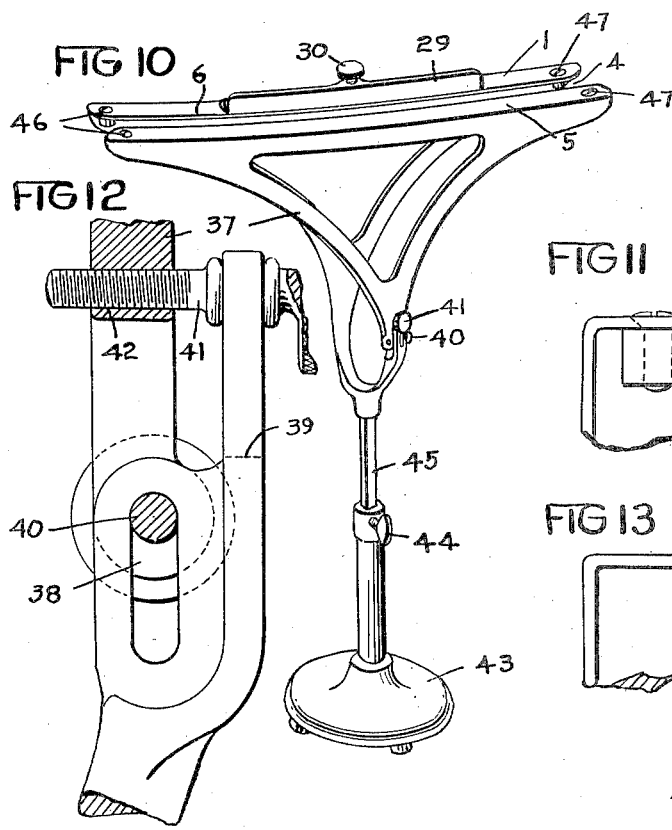
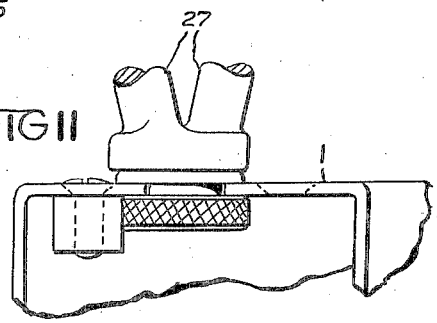
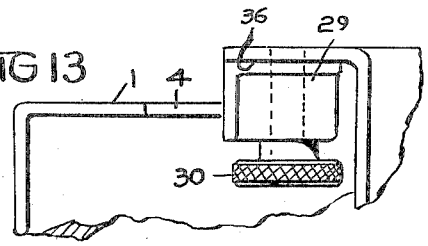
INVENTOR.
ISIDORE A. CHAIKIN.
BY Paul A. Talbot.
ATTORNEYS.

April 8, 1941.  I. A. CHAIKIN  2,237,925

GARMENT BOTTOM TRIMMER

Filed Dec. 7, 1938  3 Sheets-Sheet 3

INVENTOR.
ISIDORE A. CHAIKIN.
BY Paul A. Talbot
ATTORNEYS.

Patented Apr. 8, 1941

2,237,925

UNITED STATES PATENT OFFICE 2,237,925

GARMENT BOTTOM TRIMMER

Isidore A. Chaikin, Lawrence, N. Y.

Application December 7, 1938, Serial No. 244,497

9 Claims. (Cl. 164—71)

My invention relates to a device for trimming the bottom of garments and particularly to trimming the bottom edge of skirts, dresses, coats, etc., and has among its purposes and objects to provide:

A means of accurately and quickly trimming the bottom edges of garments to an even distance all around.

A device for cutting the bottom periphery of garments so that they hang evenly.

An adjustable convenient device for trimming the bottom of garments.

A cutting guide for garments.

A combined marking and cutting device for the bottom of garments.

I accomplish these and other objects by the construction herein described and shown in the accompanying drawings forming a part hereof in which:

Fig. 1 is a perspective view showing the application of my device.

Fig. 2 is a plan view.

Fig. 3 is an elevation.

Fig. 4 is an enlarged detail.

Fig. 5 is a plan of the cutting scissors.

Fig. 6 is a detail of the scissor joint and guide.

Fig. 7 is a plan of the marker guide.

Fig. 8 is an elevation of the marker guide.

Fig. 9 is a detail showing the marker guide in place.

Fig. 10 is a perspective view of the stand and guide.

Fig. 11 is a fragmentary detail showing the scissor guide.

Fig. 12 is a detail modification of the marker and guide.

Fig. 13 is a fragmentary detail of the marker.

Similar reference characters refer to similar parts throughout the several views of the drawings and in the specification to follow.

Figure 14:
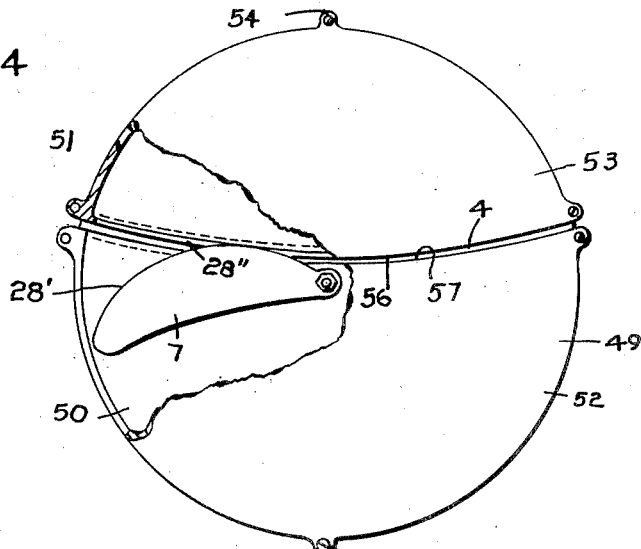
Fig. 14 is a plan view of the power trimmer.

The marking and cutting the bottom of a skirt or garment is usually done by marking the garment at intervals or at varying distances apart and then trimming the garment along a line passing over the numerous markings which results in a wavy or uneven bottom which is not accurate and the bottom edge of the garment does not hang evenly when on the model or wearer.

By the use of my device the garment is either trimmed accurately while on the form or model or may be marked continuously and accurately for the hem or fringe as desired.

I have herein described and shown in detail a simplified construction illustrating the principles embodied in my invention. A study of this disclosure by one skilled in the art to which it pertains will suggest that this detailed construction may be modified without departing from the principles underlying my invention.

Referring to the drawings I have shown a guide 1 so shaped and held at a desired distance from the floor that the lower edge 2 of the garment 3 which is to be trimmed may be inserted into the curved slot 4 formed between the concave guide number 5 and convex guide number 6 where the scissors 7 are held in vertical relationship with said guide members. As the garment is moved in relationship to said scissors which are operated in the usual manner or the scissors moved in relationship to the garment a strip 8 is trimmed from the garment which permits the garment to be continuously fed or advanced in the slot until cut all around the bottom periphery.

The guide 1 may be revolved around the garment or the garment may be revolved or moved around the guide.

Referring particularly to Figs. 1 to 5 I have shown the guide constructed to move around the garment and in this construction I have provided an arm 9 adjustably and removably secured to revolve on the center stanchion 10 of the form 11 which may be of the usual type used by dress makers and garment manufacturers. The arm 9 preferably is provided with the hinged clamp cap 12 swingingly secured to the arm by the hinge joint 13 at one end and at the other end slotted to receive the swing bolt 14 also hingeably connected to the arm by the joint and pin 15. The inner surface of the clamp cap is preferably lined with friction material 16 such as leather or brake lining fabric permitting an adjustment to be made restricting the freedom of movement of the arm on the stanchion. The wing nut 17 of the swing bolt provides the means of adjusting the tension as desired.

Slidably mounted in the arm 9 is the extension 18 which may be splined or square to prevent turning yet permitting longitudinal movement to provide radial adjustment for said arm and the guide 1 carried by it. The extension to the arm may be locked at the desired radius by the screw 19. The arm and extension are provided with the guide supporting stem 20 vertically movable in the eye 21 at the end of the extension 18 and prevented from turning in said eye by being splined or square yet affording a vertical adjustment for the guide and may be locked at the desired height from the floor by the clamp screw 22.

The guide 1 when revolved about the stanchion 10 may be of a length suitable to accommodate the scissors 7 which are held in relationship to the slot 4 by the grooved stud 23 which engages the scissors slot 24 in which is provided the spring detent 25 permitting the insertion and removal of the scissors yet preventing their accidental withdrawal from the slot and guide. The width of the top surface 26 of the guide members 5 and 6 is preferably sufficiently wide to shield the hands and particularly the fingers of the operator from being cut by the open scissors.

The handles 27 of the scissors are offset to clear the garment being trimmed as well as the guides and the scissor blades 28 are preferably curved to substantially the same radius as that of the average garment being trimmed.

Referring particularly to Fig. 10 of the drawings the guides and slot are shown as formed to suit a floor stand which is placed at the desired distance or radius to suit the garment being trimmed which may be revolved on the form to feed the garment into the slot at the rate the bottom edge is cut or marked.

I have provided a marker backing number 29 detachably secured to the convex guide 6 by the screw 30 which cooperates with the dowels 31 and 32 to hold said member in fixed relationship to the guide and slot. The guide being provided near its center with a tapped aperture 33 to receive said screw and the apertures 34 and 35 to receive said dowels. Said apertures are so positioned as to secure the member 29 on the top or bottom surface 36 of said guide as desired. When the member 29 is secured to the bottom surface the guide 5 is lowered which is accomplished by dropping the guide arm 37 in the slots 38 and 39, the slot 38 receiving the clamp screw 40 which locks said arm 37 at the desired elevation and the slot 39 receives the adjusting screw 41 which engages the slot and also the threaded or tapped hole 42 in the arm 37 permitting the width of the slot to be adjusted.

The guides may be raised and lowered in the pedestal 43 by releasing the clamp screw 44 which when tightened engages the squared or splined stem 45.

Near each end of the guides 5 and 6 stop screws 46 and 47 may be removably secured to said guides which restrict the travel of the scissors in the slot 4 which may be used by inserting the grooved stud 23 of the scissors into the slot after removal of a part of said screws 46 or 47 which engage said grooved stud when said screws are secured in position. Fig. 13 shows the guide 5 in its lowered position with the marking member 29 secured to the under surface of the guide 6.

Figure 15:
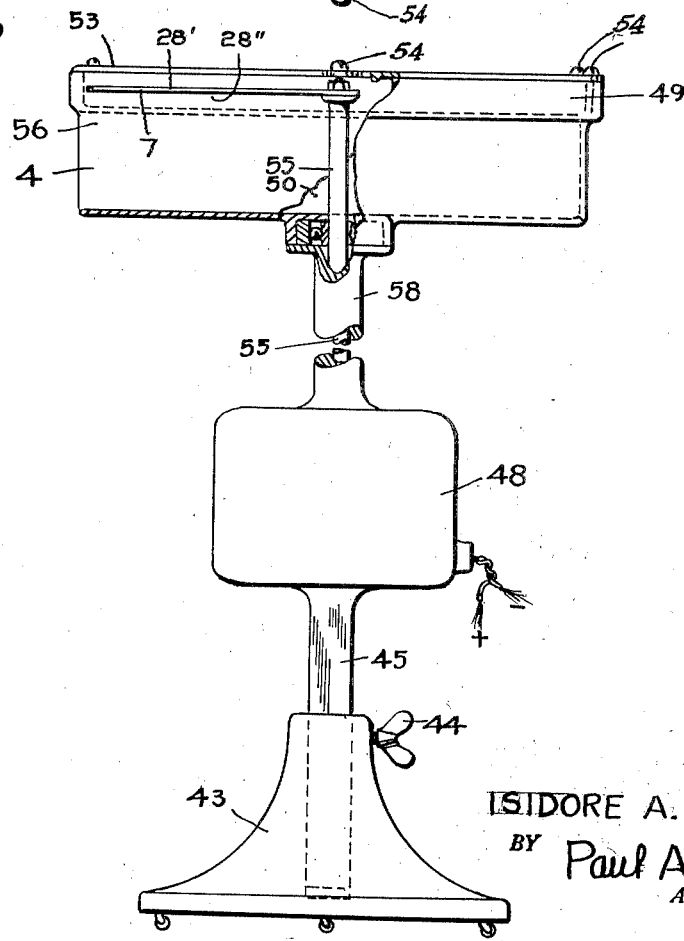
Fig. 15 is an elevation of the power trimmer.

Referring particularly to Figs. 14 and 15 of the drawings, I have shown a revolving knife or scissors 7 held in fixed relationship to the slot 4 and revolved by a motor or other source of power 48. The motor is preferably secured to the squared or splined stem 45 and is slidably mounted in the pedestal 43 to provide vertical adjustment for the scissors or knife 7 as desired and may be held when adjusted to the proper distance from the floor by the clamp screw 44.

The revolving blade 28' is preferably curved to present a point contact with stationary blade or edge 28'' which is positioned in the side surface of the slot 4 and conforms to the average radius of the garment being trimmed.

The blade 7 is preferably inclosed in the housing 49 which is constructed of two parts 50 and 51. One of each of the parts is positioned at one side of the slot 4 so that the lower edge of the garment may be fed into and through the slot and between the two parts of the housing.

Removable cover plates 52 and 53 are provided for said housing and secured to it by the screws 54.

The motor 48 is preferably connected either directly or through gearing to the blade 7 by means of the vertical shaft 55 which passes up through the part 50 of the housing.

The slot between the two parts of the housing is preferably extended downwardly between the curved side walls 56 and 57 which are connected at the bottom and to the shaft housing 58 thus holding the parts of the housing and blade 28'' in fixed relationship to each other and to the motor 48 yet providing sufficient distance below the blades for the strip 8 to pass through the slot.

I do not wish to be limited to the details of construction herein shown and described as I may wish to depart therefrom within the scope of the appended claims which set forth my invention.

I claim:

1. In a garment trimming device, guides adjustably held in fixed relationship to the floor and secured to each other in fixed relation and having a slot between said guides for the garment being trimmed and means adjusting the height of said guides from the floor.

2. In a garment trimming device, guides adjustably held in fixed relationship to the floor having a slot between said guides for the garment being trimmed and means adjusting the width of said slot between said guides.

3. In a garment trimming device, guides adjustably held in fixed relationship to the floor having a slot between said guides for the garment being trimmed and means permitting the movement of the garment in said slot as it is trimmed or marked.

4. In a garment trimming device, guides adjustably held in fixed relationship to the floor having a slot between said guides for the garment being trimmed and means holding scissors in relationship to said guides and cutting blades for said scissors being curved to the average radius of the garment being trimmed.

5. In a garment trimming device, guides adjustably held in fixed relationship to the floor having a slot between said guides for the garment being trimmed and means holding scissors in relationship to said guides and offset handles for said scissor blades to clear the garment being trimmed and said guides.

6. In a garment trimming device, guides adjustably held in fixed relationship to the floor leaving a slot between said guides for the garment being trimmed and means holding scissors in relationship to said guides, said guides having a width equal to the opened scissors and shielding the hands of the operator from the cutting blades of said scissors.

7. In a garment trimming device, guides adjustably held in fixed relationship to the floor leaving a slot between said guides for the garment being trimmed and means holding scissors in relationship to said guides and means preventing the accidental removal of the scissors in relationship to said guides.

8. In a garment trimming device, guides adjustably held in fixed relationship to the floor leaving a slot between said guides for the garment being trimmed and means adjusting the radius of said guides to the radius of the garment being trimmed.

9. In a garment trimming device, guides held in fixed relationship to the floor, said guides comprising a unit and secured in fixed relation to each other and having a slot therein for the garment being trimmed and means holding cutting blades in relationship to said guides.

ISIDORE A. CHAIKIN.